United States Patent [19]

Boylan et al.

[11] 4,430,281

[45] Feb. 7, 1984

[54] PROCESS FOR PELLETIZING LIMESTONE FINES

[75] Inventors: David R. Boylan; Mansur U. Hug, both of Ames, Iowa

[73] Assignee: Iowa Limestone Company, Des Moines, Iowa

[21] Appl. No.: 412,587

[22] Filed: Aug. 30, 1982

[51] Int. Cl.$^3$ .............................................. B28B 1/08
[52] U.S. Cl. .................................. 264/118; 264/141; 264/70
[58] Field of Search .......................... 264/118, 141, 70

[56] References Cited

U.S. PATENT DOCUMENTS

| | | | |
|---|---|---|---|
| 2,307,253 | 1/1943 | Yee et al. | 427/215 |
| 3,003,193 | 10/1961 | Chisholm | 264/141 |
| 3,390,100 | 6/1968 | Chomitz et al. | 264/141 |
| 4,015,973 | 4/1977 | Perrine | 423/430 |

Primary Examiner—James R. Hall
Attorney, Agent, or Firm—Rudolph L. Lowell

[57] ABSTRACT

A process for pelletizing limestone or other fines into pellets, having controlled properties of hardness and liquid dispersion, by the addition of a suitable binder and water to form a cohesive plastic mix and by extrusion at relatively low pressures through a plurality of orifices in a specially designed die plate. The orifices in the plate are of a predetermined length relative to the thickness of the die plate. Each orifice in the die plate is formed at the inlet end thereof with a compacting zone in which the mix is compacted as it enters the orifice, a zone in which the mix is subjected to a damped flow and high longitudinal stresses, and a zone on leaving the orifice so as to effect microstructure cracks in the surface of the extruded product. The product is vibrated or tumbled for breaking at the surface cracks therein into pellets of a substantially uniform size and is subsequently dried under controlled temperature and time conditions in order to enhance hardness and dispersibility characteristics.

8 Claims, 9 Drawing Figures

PROCESS FOR PELLETIZING LIMESTONE FINES

BACKGROUND OF THE INVENTION

Many attempts have been made to treat limestone fines resulting from the processing of limestone for the purpose of reducing dust and pollution problems or for utilizing the fines at the processing plant for making other products. These attempts to agglomerate fines have been only moderately successful since the chemical nature of limestone is such that it is not readily soluble in water or in other desirable chemicals which would allow the necessary physical changes for agglomeration to take place. In some cases compression of the fines has been used to form agglomerals. Attempts have also been made to incorporate the limestone fines with materials that are soluble and which carry the limestone fines to form granules that can be easily and readily handled. See, for example, Yee, et. al., U.S. Pat. No. 2,307,253. In further instances small amounts of a binder material have been used to assist in the agglomeration of the limestone fines. See, for example, Perrine U.S. Pat. No. 4,015,973.

In processes using extrusion, cutting of the extrudite has proven to be a major problem. Mechanical cutters cause the formation of non-uniform agglomerations of smaller sections and show a tendency to form "balls" by squeezing the moisture content to the surface. Air cutting creates granules of non uniform moisture content and results in environmental problems related thereto.

All of these processes have generally resulted in products which are friable and subject to disintegration upon handling. The process of this invention offers a solution to most of the problems previously encountered and provides for the successful pelletizing of limestone fines into granules of specified size, hardness, and dispersion characteristics.

SUMMARY OF THE INVENTION

The process of the instant invention is economical in cost and efficient in operation to pelletize limestone or other fines and to produce a wide range of product sizes, product hardness, product dispersibility and physical appearance. The pellets resulting from the process are easily transported without breaking, crumbling, or returning to their original fines state. Much of the extruder mechanism, drying, and vibrating equipment used in the process is commercially available and non-sophisticated so as to provide for its use and maintenance at a relatively low cost.

By extruding a plastic mix including fines, a suitable binder, and water, under predetermined conditions and by controlling temperature and time during a drying operation, desired hardness and dispersibility characteristics of limestone pellets are obtained. Additionally, by interchanging die plates in the extruder, the size of the limestone pellets can be varied. Concurrently desired hardness and low powdering characteristics may be varied through control of drying temperatures and times. The pelletized limestone product can thus be readily stored in silos and conveyed by conventional belt conveyors, screw conveyors and other material handling or transportation equipment without breaking up or producing dust and pollution problems.

Significantly, the process provides, during the extrusion cycle or step, for the forming or developing of micro-structural cracks in the surface of the extruded product that extend circumferentially in longitudinally spaced relation over the length of such product. As a result of these surface cracks the extruded product readily breaks up during a tumbling or vibrating operation into pellets of substantially uniform length, thereby eliminating the necessity of a cutting mechanism for cutting the extruded product into predetermined lengths.

The apparatus of the invention comprises a specially formed extrusion die plate employing three distinct regions within each extrusion aperture. The combination of a concave compacting zone, an extrusion aperture portion for damping pulsations in pressure and flow, a stress relief zone and a unique exit configuration for producing micro structure fracture lines within the extrudite product, results in a pellet of desired characteristics without cutting or otherwise agglomerating the extrudite material.

DETAILED DESCRIPTION OF THE PREFERRED EMBODIMENT

Figure 1:
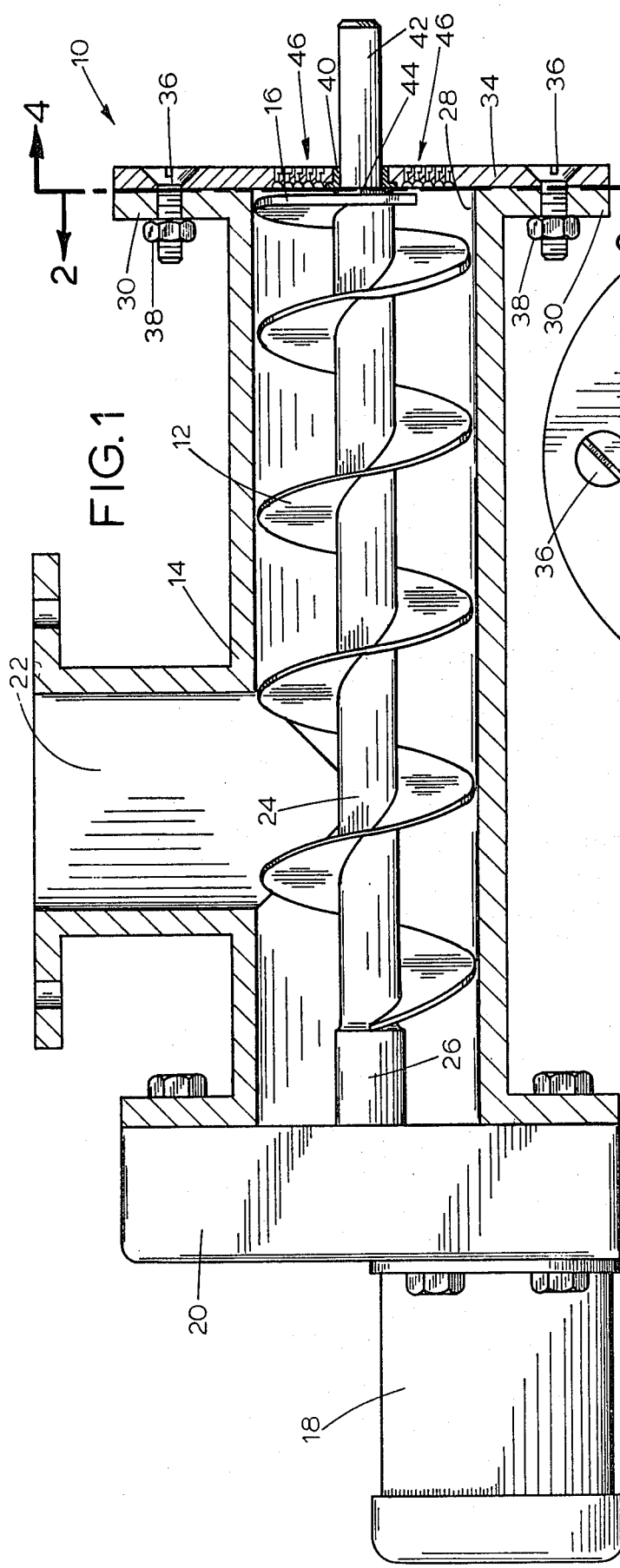
FIG. 1 is a side elevational view of the pelletizing apparatus of the present invention, with the auger housing and die plate shown in cross section, revealing the auger disposed within the housing.

The apparatus for producing limestone pellets according to the present invention is generally designated at 10 in FIG. 1 and includes a rotary auger 12 disposed within a top-fed auger housing 14. A major portion of the length of the auger 12 comprises conventional extrusion constant pitch screw auger flightings. However, the delivery end of the auger 12, terminates in a transversely extended flighting section 16 which is specially designed to present a generally flat surface parallel to a die plate 34 to provide axially directed pressure to the plastic mass material (not shown) being processed through the pelletizing apparatus 10. Although the actual pressure exerted by the auger 12 on the plastic mass material varies somewhat during each rotational cycle of the auger, the final, generally flat flighting section 16 operates to minimize such fluctuations in pressure. In tests using the auger design shown in FIG. 1, it was observed that the final, generally flat flighting section 16 produced a piston-like action relative to the inner surface of the die plate 34 to provide a reduced temperature rise in the plastic mass material within the pressure chamber between the die plate and flighting section 16 prior to extrusion. A pressure in such chamber of less than 10 pounds per square inch within the extrudite, optimally 3 or 4 pounds, was found to be most satisfactory. In addition, the final, generally flat flighting section 16 resulted in reduced moisture accumulation in and around the extrusion plate.

The auger 12 is driven by an auger drive motor 18 through a drive speed reduction system 20. Any suitable direct or indirect drive system may be employed in driving the auger 12. It is significant, however, that the drive system be capable of maintaining a constant rotational speed of the auger 12 under load conditions. In tests it has been empirically determined that auger speeds of less than 135 revolutions per minute provide improved performance as compared with higher auger speeds. In addition, it has been observed that the extruded pellet length is, to a limited extent, dependent upon the speed of extrusion.

Figure 2:
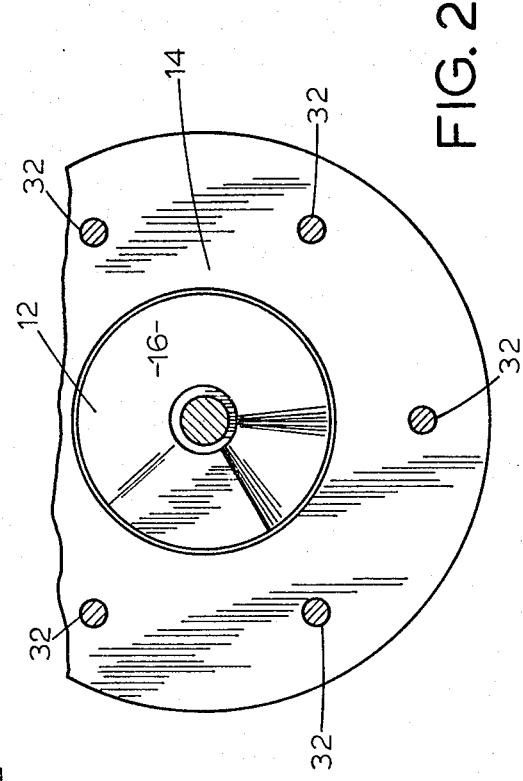
FIG. 2 is a cross-sectional view taken along line 2—2 in FIG. 1 particularly illustrating the relationship between the auger and housing.

The auger housing 14 has a material feed inlet 22 generally oriented transversely of the axis 24 of the auger 12 and positioned toward the driven end 26 of the auger 12. The auger housing 14 has a delivery end 28 formed with an outwardly extended annular flange 30 with spaced apertures 32 (see FIG. 2).

The extrusion die plate 34 is attached by bolts 36 and nuts 38 to the flange 30 and carries an auger shaft bearing 40 through which an axial shaft portion 42 of the auger 12 is extended. Accordingly, the die plate 34, through the auger shaft bearing 40, provides axial stability to the auger 12 and insures appropriate axial clearance between the auger 12 and the die plate 34.

Interposed between the die plate 34 and the final, generally flat flighting section 16 of the auger is an auger spacer member 44. The auger spacer member 44 serves to define the clearance between the flighting section 16 of the auger 12 and the internal surface of the die plate 34. This clearance is relatively small to insure a generally uniform application of pressure on the plastic mass material within the pressure chamber between the die plate and flighting section 16.

Figure 5:
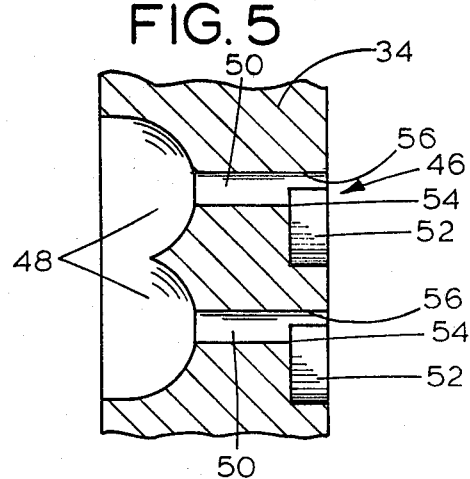
FIG. 5 is an enlarged detail cross-sectional view of the die plate, showing the structure of the passages therethrough.

The die plate 34 is formed with a plurality of specially designed extrusion passages, generally designated 46, through which the auger forces the plastic mass. As illustrated in FIG. 5, each extrusion passage 46 has three distinct portions. The first or inlet portion is a compacting zone portion 48 in which the plastic mass material is compacted prior to its passage through the remaining portions of the extrusion passages. The second portion of an extrusion passage is the extrusion aperture portion 50, which is of sufficient length to damp out any unsteady fluctuations in the flow of the plastic mass material and which provides a longitudinal stress zone. The third and final or outlet portion of an extrusion passage 46 is the stress relief zone portion 52.

The stress relief zone portion 52 is formed by undercutting one side of the exterior end of the extrusion aperture portion 50. It is believed, as a result of observation and testing, that the internal transverse stress created by the sharp ninety degree exit ledge or shoulder 54 within the stress relief zone portion 52 is a contributing factor in producing a stress concentration that forms the micro structure cracks at relatively uniform axially spaced intervals in the extrudite product (See FIG. 7). Experimental evidence also indicates that a gradual, i.e., conical shape of the compacting zone portion would not produce the same type of preferable shearing action in the plastic mix material as that produced through use of the generally concave dome shaped compacting zone portion 48 as shown in FIG. 5. Further observation and testing has indicated that an optimum ratio of the length of the extrusion aperture portion 50 to the depth of the compacting zone portion 48 is 1.33. Such a ratio has been found desirable in providing necessary damping action of unsteady flow pressures resulting from rotation of the auger.

Additionally, the concave compacting zone portion 48 has been found to provide a relatively constant flow of plastic mass material through the extrusion aperture portion 50; since the flow resistance within the compacting zone portion 48 affects the mass of the final product which is related to the pressure, velocity and shear forces created within the extrusion aperture portion 50. The maintenance of a lower velocity in the plastic mix in the compacting zone portion 48 is an advantage attributable to the concave shape of the compacting zone portion 48 relative to a conical or cylindrical compacting zone.

It has also been found that forming the die plate 34 with a thickness equal to about eight times the diameter of the extrusion aperture portion 50 optimizes the length of the extrusion aperture portion with regard to acceptable flow resistance. The precise length and diameter of the stress relief zone portion 52 does not appear to be critical, so long as it includes the sharp ninety degree exit ledge 54 together with the extended transverse pressure ledge 56.

In the preferred embodiment of the invention, the die plate 34 was heat treated to a 47–50 Rockwell scale of hardness and polished. It is believed that this treatment resulted in reduced frictional drag on the forming pellet, lower temperature rise in extrusion, and improved hardness characteristics of the pellets.

Figure 3:
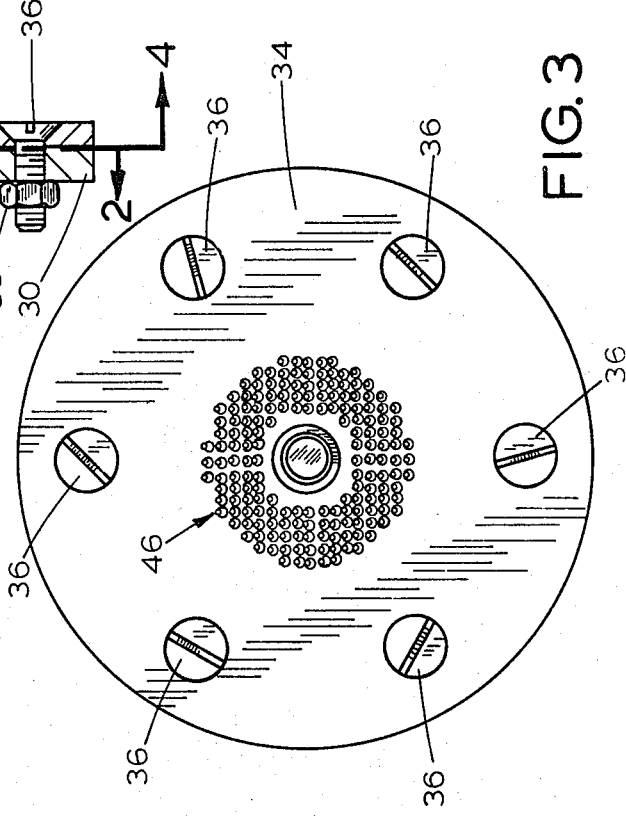
FIG. 3 is an elevational view of the die plate as seen in a plane perpendicular to the axis of the auger, and showing the exterior side of the die plate.
Figure 4:
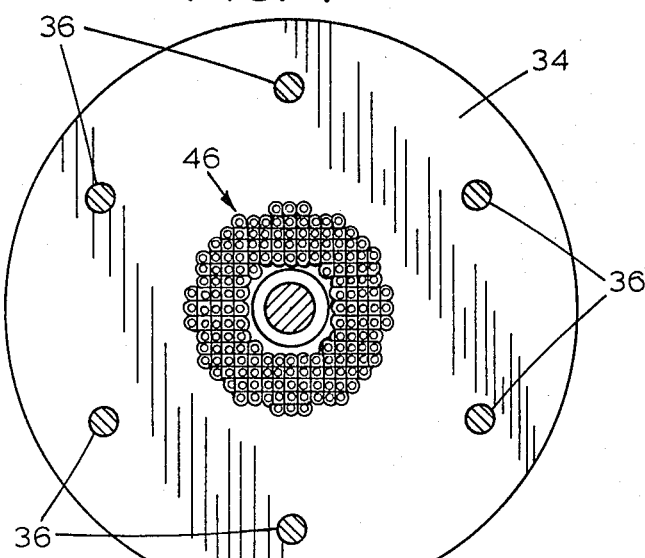
FIG. 4 is a cross-sectional view taken along line 4—4 of FIG. 1, showing the inner side of the die plate.

In FIGS. 3 and 5, it is seen that the outlet end of each passage 46 has two non-concentric bores of differing diameters, namely, the offset bore, which forms the stress relief zone 52 and the aperture portion 50, and with these non-concentric bores having at least one circumferential point in common. In FIG. 4, the interior axial view of the extrusion passages 46 shows the inlet end of each passage as having two concentric bores comprised of the concave compacting zone portion 48 and the extrusion aperture portion 50. The relative close spacing between the axes of the extrusion passages 46 provides full material flow characteristics while reducing to a minimum the occurrence of any stagnant areas between adjacent compacting zone portions 48.

Figure 6:
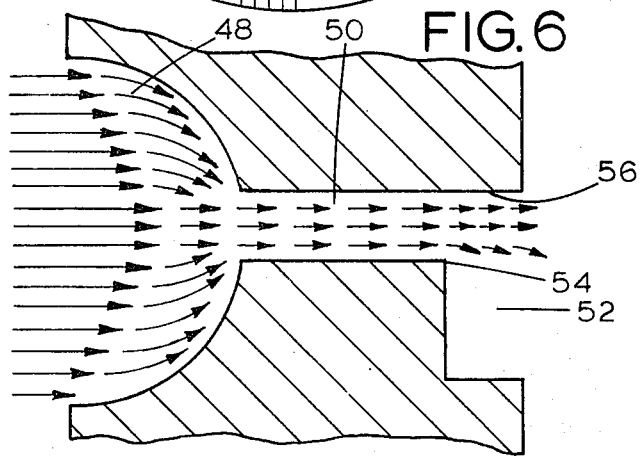
FIG. 6 is an enlarged cross-sectional detail view of a single passage through the die plate, with arrows indicating material flow pressures.
Figure 7:
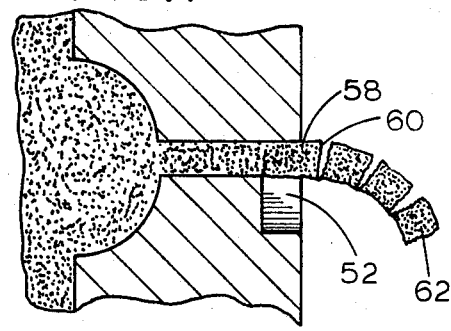
FIG. 7 is illustrated similar to Fig. 6 and shows the formation of micro structure cracks in the extrudite during its flow through a die passage.

As illustrated in FIG. 6, the plastic mass material upon entering the compacting zone portion 48, is compressed and tends to be directed toward the entrance of the extrusion aperture portion 50 where pulsations in pressure resulting from rotation of the auger are dampened, to provide a more steady flow of and a more uniform pressure on the material being extruded. Upon exiting the extrusion aperture portion 50, the extrudite product 58 (see FIG. 7) passes the ninety degree exit ledge 54 on one side of passage 46, but is confined by the transverse pressure ledge 56 at the opposite side of the passage 46. As illustrated in FIG. 7, the extrudite product 58, upon passing through the stress relief zone portion 52, is subjected to a transverse stress which develops micro structure fracture lines 60 that result in the fracturing of the extrudite product 58 into rather uniform length pellets 62, which are subsequently dried and hardened as described below. There is thus eliminated the need of a cutting device for cutting the extrudite into pellets.

Figure 9:
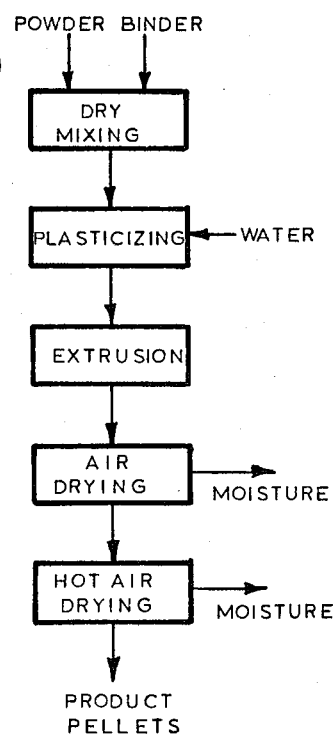
FIG. 9 is a block flow diagram of the process of the instant invention.

As illustrated in FIG. 9, the process of the present invention comprises mixing the limestone fines with a suitable binder; plasticizing the dry mix through the addition of water while mixing and working the plastic mass material; extruding the plastic mass material in accordance with the description above; and then air drying and vibrating the resulting extrudite to insure the fracturing thereof into relatively uniform pellets (see FIG. 7). The pellets are then subjected to hot air drying to obtain desired hardness and liquid dispersibility characteristics.

In actual tests using the apparatus described above, it has been observed that limestone pellets having desirable hardness, dispersibility, and size of $-8/+12$ mesh, may be formed according to the following steps: (1) Mixing dried limestone fines of the size range of $-100$ to $-300$ mesh with sodium bentonite in the size range of $-200$ to $-400$ mesh in a dry mixer/blender, with the appropriate proportion of limestone and sodium bentonite by weight within the range of 94% to 98% limestone fines with 2% to 6% sodium bentonite; (2) Adding water to the dried mix in a proportion, by weight of approximately 15% to approximately 25% in order to develop a plastic or heavy slurry state, while at the same time stirring and masticizing the mass to begin the development of shear stresses within the plastic mass material; (3) Extruding the plastic mass material through the die plate 34, described above, with passage diameters of 1/16" to 1/8", depending on the desired pellet size, while maintaining the temperature of the plastic mass material at about room temperature in order to maintain a uniform moisture content during the extrusion process; (4) Collecting the extrudite from the extruder by appropriate conveyance, such as a continuous belt conveyor or in batches; (5) Air drying and vibrating or tumbling the extrudite to break it into pellets; and (6) Subjecting the pellets to appropriate high temperature levels to produce desired product characteristics of hardness and dispersibility.

Figure 8:
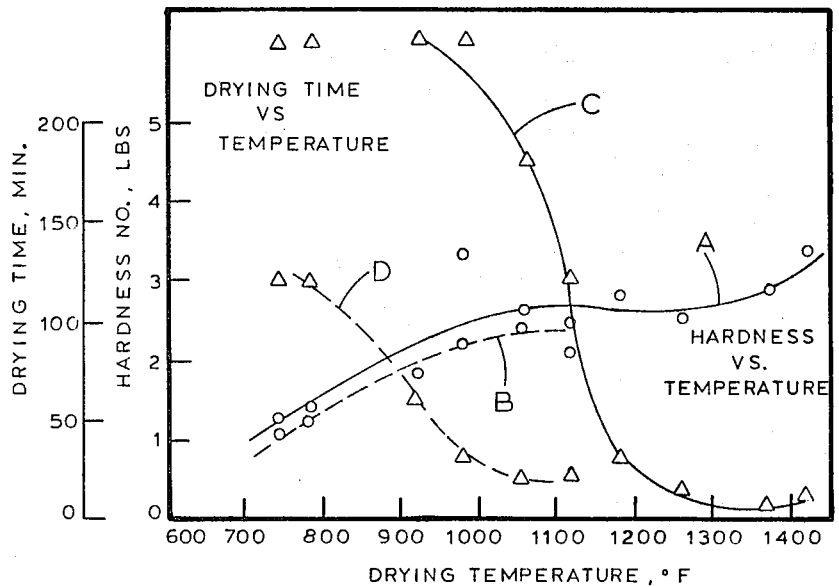
FIG. 8 is a graphic representation of observed relationships between pellet hardness, drying time, and temperature.

The relationship between hardness, drying time, and drying temperature is illustrated in FIG. 8. Curves A and B, beginning at the lower left hand corner of the graph and proceeding upwardly to the right, relate drying temperature to hardness. The hardness scale is from zero to five and is recorded in pounds of crushing strength as determined by use of standard Instron test apparatus. Curve A represents empirical data for maximum acceptable hardness characteristics. Curve B represents data based on minimum drying time to produce an acceptable pellet product. Hot drying temperatures below 800° F. did not produce granules of significant hardness. Hot drying temperatures near 1000° F. produced granules of reasonable hardness, and very high temperatures produced exceedingly hard granules. Each of the points indicated in FIG. 8 represents a replication of 10-15 determinations.

The drying time curves C and D, starting at the upper left of the graph and proceeding downwardly to the right, indicate that for temperatures below 900° F., an adequate drying time is very long (nearly 240 minutes). Drying time drops dramatically, however, at temperatures greater than 1000° F. and is very short at temperatures above 1200° F. Curve C represents data for maximum acceptable hardness and Curve D represents data based upon minimum drying time to produce an acceptable product. It is evident that a compromise between drying time and temperature can be chosen between Curves C and D which will produce acceptable pellet characteristics. The desired end use for the pellets is a substantial factor in determining the required hardness.

In addition, it is known that pellets dried at high temperatures are less dispersible than those dried at lower temperatures. Liquid dispersibility is a measure of the propensity of a pellet to break-up into fine particles by the action of a liquid medium. This characteristic for the pellets of the instant invention is a function of the product treatment as well as the processing stages. High pellet hardness exhibits low dispersibility, i.e., the pellets disperse or break up in liquid media over a longer period than those with lower hardness. By controlling product treatment through drying time and temperature, hardness and dispersibility can be compromised to provide the most acceptable pellet.

Another factor to be considered in assessing an appropriate hardness level is the propensity of a pellet to fracture or powder in the absence of a liquid medium, e.g., during handling or transportation. Such powdering is inversely related to hardness.

The process of the instant invention produces a pellet with desirable characteristics related to hardness and to dispersibility. This fact was demonstrated in the laboratory by examination of the pellets under a scanning electron microscope. Magnification up to three hundred times showed that the surface of the pellet exiting the die plate was quite porous and non-homogeneous. The electron micrographs showed that the distribution of the particles in the pellet are such that the porosity in the longitudinal direction is greater than in the radial or transverse direction. At magnifications up to two thousand times, the micrographs show that the edges of the particles making up a pellet become more diffused at high temperatures indicating point-to-point fusion and some reduction in porosity. This is believed to be due to surfacing of colloidal material from the interior of the pellet through evaporation of moisture. It has been shown that hardness is a function of both extrusion and drying conditions. The extrusion conditions are a function of the die plate 34, the auger feed rate, moisture content, and the shear action imparted to the plastic mass material at the ledge 54.

Although the invention as set out relates to the pelletizing of limestone fines, the process has been found to also be applicable to the pelletizing of mixed feed material and other limestone-salt compositions. It should be noted that bentonite was chosen as a binder in the preferred embodiment of the invention as a function of economics and convenience. Any agent which would form a plastic state and allow the plasticization step to be fully developed for extrusion could be used in the process. These may include soluble salts such as sulphate, potassium, chloride, and nitrates, as well as bentonite. The amount of bentonite chosen in the preferred embodiment is a compromise between hardness characteristics desired, the dilution of the calcium content of material allowed, and the ease of handling required. Even though compositions of 96% limestone fines and 4% bentonite have been found most desirable, compositions from 1% to 6% have been demonstrated to form suitable pellets from limestone fines.

It should be clear from the foregoing description of the preferred embodiment that other mechanical means and compositions could be employed in accomplishing the broad purposes of the invention. It should be understood that this description is intended to illustrate but not to limit the scope of the invention as defined in the appended claims.

We claim:

1. A process for pelletizing limestone fines in substantially uniformly sized pellets having controlled liquid dispersion and low-powdering characteristics, comprising:
   (a) intimately mixing in dry form of approximately 94% to 98% limestone fines with approximately 2% to 6% sodium bentonite by weight,
   (b) adding approximately 15% to approximately 25% water by weight to the dry mix,
   (c) mixing the water and the dry mix into a cohesive plastic state,
   (d) forming a die plate with orifices therethrough each of which has a diameter equal to approximately one-eighth the thickness of the die plate,
   (e) producing a zone for compacting the plastic mix as it enters each orifice,
   (f) extruding the plastic mix through the die plate orifices at a pressure of less than about 10 pounds per square inch to produce an extrudite mix, and
   (g) subjecting the extrudite mix adjacent the outlet of each orifice to a zone for producing and then relieving longitudinal stresses therein to form microstructure cracks in the surface of the extruded product.

2. A process according to claim 1, wherein said intimately mixing step and said adding step comprise:
   (a) intimately mixing in dry form approximately 96% limestone fines with approximately 4% sodium bentonite by weight, and
   (b) adding approximately 24% water by weight to the dry mix.

3. A process according to claim 1, wherein said producing step comprises:
   (a) forming said compacting zone in a concave shape at the inlet end of each orifice.

4. A process according to claim 1, wherein said subjecting step comprises:
   (a) overcutting one side of the terminal end of each orifice thereby providing a terminal exit for the extrudite mix which applies high transverse stresses to the extrudite mix.

5. A process according to claim 1, including the added steps of:
   (a) breaking the extrudite mix product along the surface cracks therein into pellets of substantially uniform size, and
   (b) drying the pellets to develop a desired hardness characteristic.

6. A process according to claim 1, including the added steps of:
   (a) vibrating the extrudite mix product to break the product along the surface cracks therein into pellets of $-8$ to $+12$ mesh size, and
   (b) drying the pellets at a temperature of not less than about 900° F. for a time period of not more than about 150 minutes.

7. A process according to claim 1, wherein:
   (a) said limestone fines are of a size from about a $-100$ mesh size to about a $-300$ mesh size and the sodium bentonite is in a range size of from about $-200$ mesh size to about $-400$ mesh size.

8. A process according to claim 1 wherein:
   (a) the ratio of length of travel of the plastic mixture through the orifice to the length of travel of the plastic mix through the compacting zone is 1:33.

* * * * *

UNITED STATES PATENT AND TRADEMARK OFFICE
CERTIFICATE OF CORRECTION

PATENT NO. : 4,430,281
DATED : February 7, 1984
INVENTOR(S) : David R. Boylan; Mansur U. Huq It is certified that error appears in the above-identified patent and that said Letters Patent are hereby corrected as shown below:

The name of co-inventor "Mansur U. Hug" should be

--MANSUR U. HUQ--.

Signed and Sealed this

Nineteenth Day of February 1985

[SEAL]

Attest:

DONALD J. QUIGG

*Attesting Officer*      *Acting Commissioner of Patents and Trademarks*